US010025457B2

(12) United States Patent
Mizrachi et al.

(10) Patent No.: US 10,025,457 B2
(45) Date of Patent: Jul. 17, 2018

(54) FILE FOLDER DISPLAY

(71) Applicant: International Business Machines Corporation, Armonk, NY (US)

(72) Inventors: Boaz Mizrachi, Haifa (IL); Lisa S DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 14/886,053

(22) Filed: Oct. 18, 2015

(65) Prior Publication Data

US 2017/0109010 A1   Apr. 20, 2017

(51) Int. Cl.
*G06F 3/0484* (2013.01)
*G06F 3/0481* (2013.01)
*G06F 17/30* (2006.01)

(52) U.S. Cl.
CPC ...... *G06F 3/04817* (2013.01); *G06F 3/04842* (2013.01); *G06F 17/3012* (2013.01)

(58) Field of Classification Search
CPC ...... G06F 3/048; G06F 3/0481; G06F 3/0482; G06F 3/0484; G06F 3/04817; G06F 3/04842; G06F 17/30; G06F 17/3012
See application file for complete search history.

(56) References Cited

U.S. PATENT DOCUMENTS

| 7,496,859 | B2 | | 2/2009 | Watanabe | |
|---|---|---|---|---|---|
| 7,697,791 | B1 | * | 4/2010 | Chan | G06Q 30/02 382/305 |
| 7,752,534 | B2 | * | 7/2010 | Blanchard, III | G06F 17/22 715/201 |
| 7,783,632 | B2 | * | 8/2010 | Richardson | G06F 17/30864 707/727 |
| 7,792,521 | B2 | * | 9/2010 | Arnold | G06F 12/0253 340/3.3 |
| 7,818,342 | B2 | * | 10/2010 | Stuhec | G06F 17/30569 707/777 |
| 2006/0265421 | A1 | * | 11/2006 | Ranasinghe | G06F 17/30743 |
| 2007/0226640 | A1 | * | 9/2007 | Holbrook | G06F 17/30864 715/765 |
| 2009/0138481 | A1 | * | 5/2009 | Chatley | G06F 3/0613 |
| 2009/0327960 | A1 | * | 12/2009 | Dernis | G06F 3/04817 715/823 |
| 2010/0205566 | A1 | | 8/2010 | Matoba | |
| 2010/0211575 | A1 | * | 8/2010 | Collins | G06F 17/30044 707/749 |
| 2011/0289139 | A1 | * | 11/2011 | McIntosh | H04N 21/252 709/203 |
| 2013/0195422 | A1 | * | 8/2013 | Patil | H04N 21/23424 386/239 |
| 2013/0279811 | A1 | | 10/2013 | Cheng | |
| 2014/0007014 | A1 | | 1/2014 | Ouzts et al. | |
| 2016/0119684 | A1 | * | 4/2016 | Flores | H04N 21/252 725/45 |
| 2017/0076151 | A1 | * | 3/2017 | Roy | G06K 9/00456 |
| 2017/0090695 | A1 | * | 3/2017 | Pierce | G06F 3/0488 |
| 2017/0102831 | A1 | * | 4/2017 | Stauffer | G06F 3/0481 |
| 2017/0116527 | A1 | * | 4/2017 | Cohen | G06N 5/02 |

* cited by examiner

*Primary Examiner* — Xiomar L Bautista

(57) ABSTRACT

Techniques for display a file folder are described herein. In one example, a system includes a processor to detect a transmission of one or more files from a file folder to a service and calculate a popularity value for each of the one or more files based on detected feedback from the service. The processor can also display the file with the highest popularity value as an icon for the file folder.

18 Claims, 4 Drawing Sheets

200

FILE FOLDER DISPLAY

BACKGROUND

The present disclosure relates to displaying a file folder, and more specifically, but not exclusively, to displaying an icon corresponding to a file folder.

SUMMARY

According to an embodiment described herein, a system for displaying file folders can include a processor to detect a transmission of one or more files from a file folder to a service. The processor can also calculate a popularity value for each of the one or more files based on detected feedback from the service and display the file with the highest popularity value as an icon for the file folder.

According to another embodiment, a method for displaying file folders can include detecting, via a processor, a transmission of one or more files from a file folder to a service. The method can also include calculating, via the processor, a popularity value for each of the one or more files based on detected feedback from the service, the feedback based on metrics associated with users of the service and displaying, via the processor, the file with the highest popularity value as an icon for the file folder.

According to another embodiment, a computer program product for displaying file folders can include a computer readable storage medium having program instructions embodied therewith, wherein the computer readable storage medium is not a transitory signal per se. The program instructions can be executable by a processor to cause the processor to detect, via the processor, a transmission of one or more files from a file folder to a service and calculate, via the processor, a popularity value for each of the one or more files based on detected feedback from the service, the feedback based on metrics associated with users of the service. The program instructions can also be executable by a processor to cause the processor to replace, via the processor, a default icon with the file corresponding to the highest popularity value from the file folder.

DETAILED DESCRIPTION

As storage capacities of computing devices continue to expand, users are creating a larger number of files and additional digital content. For example, users can store a larger number of photographs, videos, and other multimedia files on computing devices with more storage capacity. As a result, searching the files and file folders can become increasingly time consuming.

The present disclosure describes techniques for displaying a file folder with an icon that is selected based on a file in the file folder. A file folder, as referred to herein, can include any suitable directory or collection of files in a file system. The file system can be a flat file system without subdirectories or the file system can be a hierarchical file system that organizes files into any suitable number of directories and subdirectories. An icon, as referred to herein, can include any image from one or more files that is to be displayed and logically coupled to a file folder. In some examples, the icons can be associated with a name of a file folder. In some embodiments, the icons selected to be displayed for each file folder are based on popularity values associated with files stored in the file folders. For example, any number of files from a file folder can be transmitted to an external website, service, or device. Additional users can then provide feedback corresponding to the transmitted files and the feedback can be used to determine which files are the most popular. In some embodiments, the most popular file or files can be displayed as an icon for the corresponding file folder.

Figure 1:
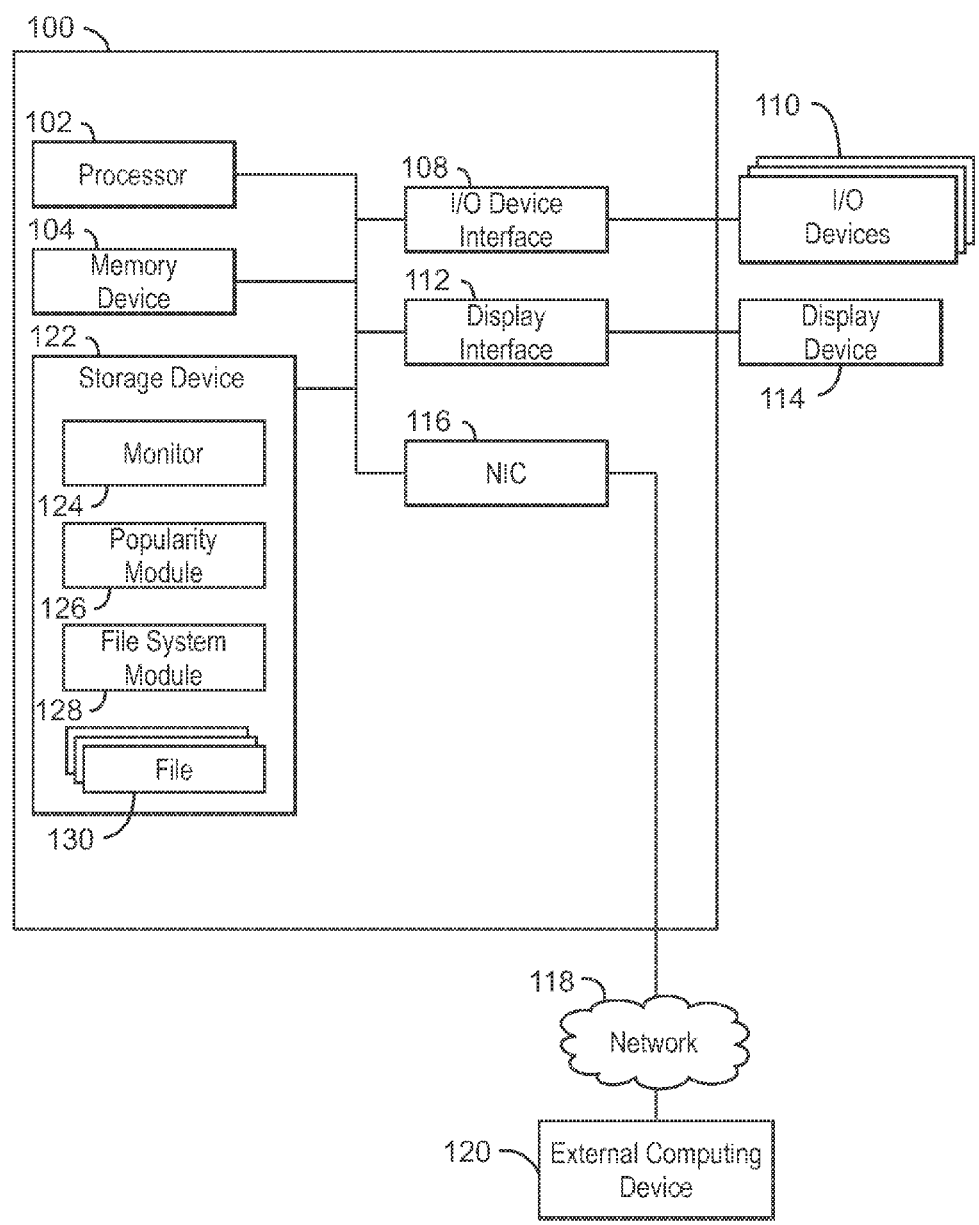
FIG. 1 depicts a block diagram of an example computing system that can display file folders according to an embodiment described herein.

With reference now to FIG. 1, an example computing device is depicted that can display file folders. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external webserver 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include a monitor 124, a popularity module 126, and a file system module 128. The monitor 124 can detect a transmission of one or more files 130 from a file folder to a service. For example, the monitor 124 can detect any transmission or upload of a local file 130 to an external service, webserver, or any other suitable external device 120 or service. The local file 130 can include an image file, a video file, or any other suitable file that can be displayed via the external service. In some embodiments, the popularity module 126 can calculate a popularity value for each of the one or more files based on detected feedback from the service. For example, the popularity value 126 can detect information related to the popularity of a file transmitted to a service and calculate a popularity value based on the information. The calculation of the popularity value is discussed in greater detail below in relation to FIG. 2. Furthermore, the file system module 128 can display the file with the highest popularity value as an icon for the file folder. For example, the file system module 128 can detect the file that is most popular with users of a service and display the file as the icon for a file folder.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the monitor 124, popularity module 126, and file system module 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the monitor 124, popularity module 126, and file system module 128, can be implemented with logic, wherein the logic, as referred to herein, can include any suitable hardware (e.g., a processor, among others), software (e.g., an application, among others), firmware, or any suitable combination of hardware, software, and firmware.

Figure 2:
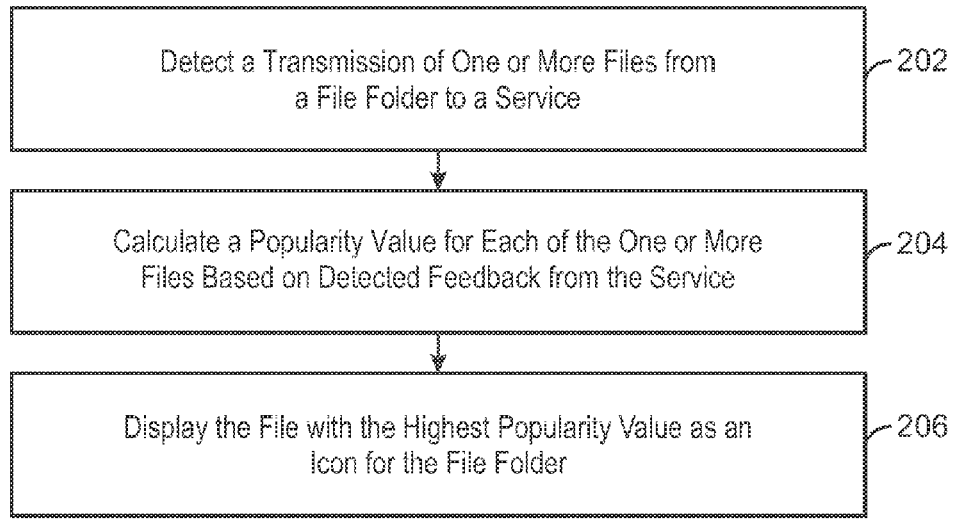
FIG. 2 is a process flow diagram of an example method that can display file folders according to an embodiment described herein.

FIG. 2 is a process flow diagram of an example method that can display file folders. The method 200 can be implemented with any suitable computing device, such as the computing device 100 of FIG. 1.

At block 202, a monitor 124 can detect a transmission of one or more files from a file folder to a service. As discussed above, the files can include any image file, video file, or any other suitable file. The monitor 124 can detect a transmission of any number of files from a file folder to a service, such as a social media website, among others. The transmitted files can then be shared with any number of additional users who have access to the service.

At block 204, a popularity module 126 can calculate a popularity value for each of the one or more transmitted files based on detected feedback from the service. For example, the popularity module 126 can detect feedback from a service that indicates various metrics corresponding to the popularity of a file. The metrics can include the number of users who have shared the file with additional users, the number of users who have provided a comment related to the file, the number of users who have provided an indication that the user enjoys viewing the file, a number of downloads of the transmitted files, and the like. In some embodiments, the popularity module 126 can combine the received metrics using any suitable formula. For example, the popularity module 126 can assign weights to each metric and calculate the popularity value based on a weighted average of the metrics. In some examples, the popularity module 126 can detect a popularity value 126 that is calculated by the service to which the file has been transmitted.

At block 206, a file system module 128 can display the file with the highest popularity value as an icon for the file folder. For example, the file system module 128 can display an image file as an icon for a file folder if the image file has the highest popularity value of the files uploaded to a service. The icon of a file folder can then reflect the file in the file folder that has generated the most positive feedback from a service. In some embodiments, the file system module 128 can detect or capture any suitable image from a video uploaded to a service and set the captured image as an icon for a file folder if the video has the highest popularity value of files uploaded to a service from a file folder. In some examples, the file system folder 128 can display an icon for each file folder that includes at least one file that has been uploaded to a service. In some embodiments, the file system module 128 can also disable the ability to display the file with the highest popularity value as an icon for a file folder.

In some embodiments, the file system module 128 can rank one or more files in a folder based on the popularity values of each file. For example, the file system module 128 can rank the files from highest popularity value to lowest popularity value, or any other suitable ranking. If the file system module 128 detects multiple subdirectories with icons that have been selected based on popularity values, the file system module 128 can display the file with the highest popularity value as the icon for the parent directory.

In some embodiments, the file system module 128 can detect a selection of an icon for a file with the highest popularity value, detect a selection of an icon associated with a file corresponding to a lower popularity value, and swap the icon with the higher popularity value with the icon corresponding to a lower popularity value. For example, the files can be organized in a file folder based on a ranking according to popularity values such that the first displayed file has the highest popularity value and is to be displayed as the icon for the file folder. This enables a file system module 128 to detect modifications to the icons associated with a file folder with a drag and drop operation that indicates a file with a lower popularity value is to be displayed first in the folder and also used as an icon for the file folder.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the file system module 128 can also detect a frequency value indicating a number of times the file folder is accessed within a period of time and modify a size of the icon based on the frequency value. In some embodiments, the size of the icon of a file folder can increase when the file folder is accessed a number of times that exceeds a predetermined threshold and the size of the icon can also decrease when the file folder is accessed a number of times that is below a predetermined threshold.

Figure 3:
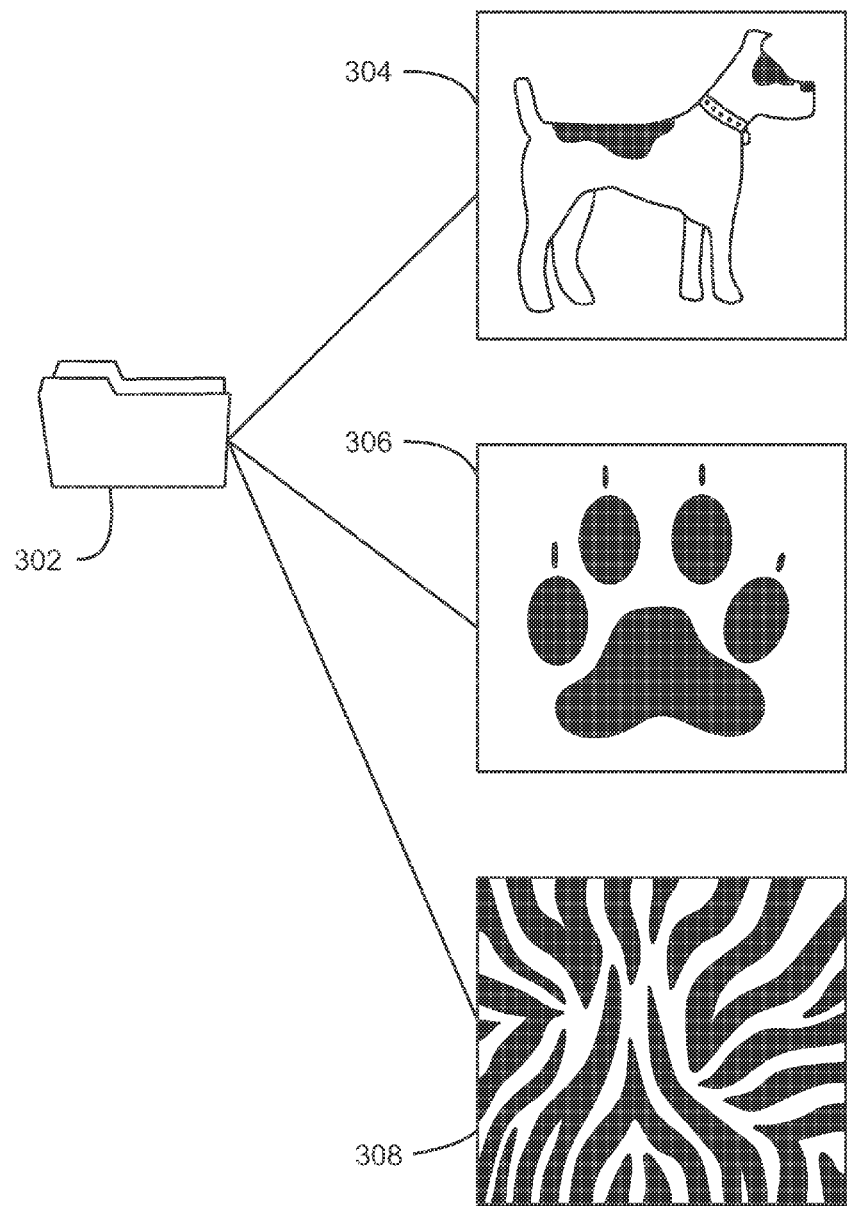
FIG. 3 is an example illustration of a file folder.

FIG. 3 provides an illustration of a file folder. The file folder can be displayed with any suitable computing device, such as the computing system 100 of FIG. 1. The file folder 302 can include any suitable number of files 304, 306, and 308. The files 304, 306, and 308 can include any type of content such as photographs, videos, and text, among others. The file folder can 302 can include any suitable icon that represents the files stored in the folder. For example, the file folder 302 can be displayed with an icon that represents a photograph file stored in the file folder 302. In some examples, the file folder 302 is initially displayed with a generic default icon. The default icon corresponding to the file folder 302 can be swapped or replaced with file 304, 306, or 308 based on detected popularity values for the files. In some embodiments, the icon for a file folder can be a montage or collection of multiple files stored in the file folder 302. For example, the icon for a file folder can include any number of files with a popularity value above a threshold value.

In some examples, a file system module 128 can modify a color gradient of the icon for a file folder based on a number of times the file folder is accessed within a period of time. For example, the file system module 128 can darken the color gradient of an icon that is not accessed more than a predetermined number of times within a period of time or the file system module 128 can brighten the color gradient of an icon that is accessed more than a predetermined number of times within a period of time. In some embodiments, the file system module 128 can also identify the file folder as black listed if the frequency value of the file folder is below a threshold. Black listed, as referred to herein, can indicate that a file folder is rarely accessed or accessed a number of times below a predetermined threshold. In some examples, the file system module 128 can disable a modification of the icon for a file folder that has been black listed. In some embodiments, a black listed folder can be displayed with a default icon. This can reduce the consumption of resources used to maintain icons for file folders associated with popular files.

In some embodiments, the file system module 128 can identify a time period when the file folder is accessed a number of times that is below a threshold value and disable displaying the icon during the time period. For example, the file system module 128 can detect that a file folder is frequently accessed within a particular time of a day or a particular day of the week, or any other suitable time period. The file system module 128 can then disable displaying and/or modifying the icon during a period of time in which the file folder is rarely accessed.

In some embodiments, the file system module 128 can enlarge or decrease the size of an icon associated with a file folder 302 based on a number of files within the file folder. The file system module 128 can also enlarge or decrease the size of an icon associated with a file folder baser 302 based on an indication that the number of files in the file folder 302 that have been transmitted to a service exceeds a threshold.

It is to be understood that the file folder 302 of FIG. 3 can include any suitable number of files. Furthermore, any number of file folders 302 can be joined together to form any suitable hierarchy or file system structure. Moreover, the file folder 302 can include any number of digital files, emails, or any other suitable digital information. Accordingly, the file folder 302 can be associated with an icon in any system or service that organizes data in at least one directory or two separate logical levels.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
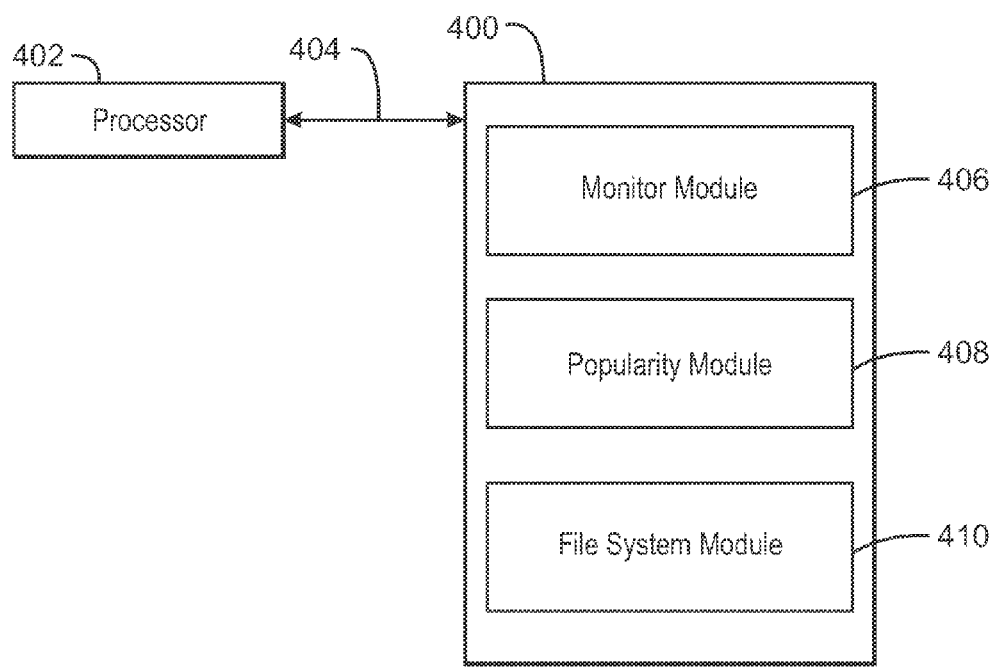
FIG. 4 is a tangible, non-transitory computer-readable medium that can display file folders according to an embodiment described herein.

Referring now to FIG. 4, a block diagram is depicted of an example of a tangible, non-transitory computer-readable medium that can display file folders. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a monitor module 406 can detect a transmission of one or more files from a file folder to a service. Furthermore, a popularity module 408 can calculate a popularity value for each of the one or more files based on detected feedback from the service. Additionally, a file system module 410 can display the file with the highest popularity value as an icon for the file folder.

It is to be understood that any number of additional software components not shown in FIG. 4 may be included within the tangible, non-transitory, computer-readable medium 400, depending on the specific application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for displaying file folders comprising a processor to:
   detect a transmission of one or more files from a file folder to a service;
   calculate a popularity value for each of the one or more files based on detected feedback from the service;
   display the file with the highest popularity value as an icon for the file folder;
   identify a time period when the file folder is accessed a number of times that is below a threshold value; and
   disable displaying the icon during the time period.

2. The system of claim 1, wherein the processor is to rank the one or more files based on the popularity values, each popularity value comprising a number of users who have shared one of the files with additional users, the number of users who have provided a comment related to one of the files, the number of users who have provided an indication that the users enjoy viewing one of the files, or a number of downloads of one of the files.

3. The system of claim 1, wherein the processor is to:
   detect a frequency value indicating a number of times the file folder is accessed within a second time period; and
   modify a size of the icon based on the frequency value.

4. The system of claim 3, wherein the processor is to:
   identify the file folder as black listed if the frequency value of the file folder is below a threshold; and
   disable modification of the icon for the file folder.

5. The system of claim 1, wherein the processor is to:
   detect a selection of the icon;
   detect a selection of an icon with a lower popularity value; and
   swap the icon with the higher popularity value with the icon corresponding to a lower popularity value.

6. The system of claim 1, wherein the processor is to modify a color gradient of the icon based on a number of times the file folder is accessed within a second time period.

7. A method for displaying file folders comprising:
- detecting, via a processor, a transmission of one or more files from a file folder to a service;
- calculating, via the processor, a popularity value for each of the one or more files based on detected feedback from the service, the feedback based on metrics associated with users of the service;
- displaying, via the processor, the file with the highest popularity value as an icon for the file folder;
- identifying, via the processor, a time period when the file folder is accessed a number of times that is below a threshold value; and
- disabling, via the processor, displaying the icon during the time period.

8. The method of claim 7, comprising ranking the one or more files based on the popularity values, each popularity value comprising a number of users who have shared one of the files with additional users, the number of users who have provided a comment related to one of the files, the number of users who have provided an indication that the users enjoy viewing one of the files, or a number of downloads of one of the files.

9. The method of claim 7, comprising:
- detecting a frequency value indicating a number of times the file folder is accessed within a second time period; and
- modifying a size of the icon based on the frequency value.

10. The method of claim 9, comprising:
- identifying the file folder as black listed if the frequency value of the file folder is below a threshold; and
- disabling modification of the icon for the file folder.

11. The method of claim 7, comprising:
- detecting a selection of the icon;
- detecting a selection of an icon with a lower popularity value; and
- swapping the icon with the higher popularity value with the icon corresponding to a lower popularity value.

12. The method of claim 7, comprising modifying a color gradient of the icon based on a number of times the file folder is accessed within a second time period.

13. A computer program product for displaying file folders, the computer program product comprising a computer readable storage medium having program instructions embodied therewith, wherein the computer readable storage medium is not a transitory signal per se, the program instructions executable by a processor to cause the processor to:
- detect, via the processor, a transmission of one or more files from a file folder to a service;
- calculate, via the processor, a popularity value for each of the one or more files based on detected feedback from the service, the feedback based on metrics associated with users of the service; and
- replace, via the processor, a default icon with the file corresponding to the highest popularity value from the file folder;
- identify, via the processor, a time period when the file folder is accessed a number of times that is below a threshold value; and
- disable, via the processor, displaying the file corresponding to the highest popularity value from the file folder as the icon during the time period.

14. The computer program product of claim 13, wherein the program instructions cause the processor to rank the one or more files based on the popularity values, each popularity value comprising a number of users who have shared one of the files with additional users, the number of users who have provided a comment related to one of the files, the number of users who have provided an indication that the users enjoy viewing one of the files, or a number of downloads of one of the files.

15. The computer program product of claim 13, wherein the program instructions cause the processor to:
- detect a frequency value indicating a number of times the file folder is accessed within a second time period; and
- modify a size of the icon based on the frequency value.

16. The computer program product of claim 15, wherein the program instructions cause the processor to:
- identify the file folder as black listed if the frequency value of the file folder is below a threshold; and
- disable modification of the icon for the file folder.

17. The computer program product of claim 13, wherein the program instructions cause the processor to:
- detect a selection of the icon;
- detect a selection of an icon with a lower popularity value; and
- swap the icon with the higher popularity value with the icon corresponding to a lower popularity value.

18. The computer program product of claim 13, wherein the program instructions cause the processor to modify a color gradient of the icon based on a number of times the file folder is accessed within a second time period.

* * * * *